(12) United States Patent
Modelski

(10) Patent No.: US 6,847,640 B1
(45) Date of Patent: Jan. 25, 2005

(54) HIGH SPEED PHYSICAL CIRCUITS OF MEMORY INTERFACE

(75) Inventor: Richard P. Modelski, Hollis, NH (US)

(73) Assignee: Nortel Networks Limited (CA)

( * ) Notice: Subject to any disclaimer, the term of this patent is extended or adjusted under 35 U.S.C. 154(b) by 872 days.

(21) Appl. No.: 09/741,858

(22) Filed: Dec. 22, 2000

(51) Int. Cl.[7] .............................................. H04L 12/28
(52) U.S. Cl. ..................... 370/389; 370/503; 375/356; 375/376
(58) Field of Search ............................. 370/516, 517, 370/518, 519, 389, 401, 503, 480, 345, 428, 535, 537; 375/294, 327, 354, 376, 356

(56) References Cited

U.S. PATENT DOCUMENTS

| | | | | |
|---|---|---|---|---|
| 5,740,411 | A | * | 4/1998 | Hearn et al. ................. 713/503 |
| 6,029,250 | A | * | 2/2000 | Keeth ........................ 713/400 |
| 6,173,432 | B1 | * | 1/2001 | Harrison ........................ 716/1 |
| 6,282,210 | B1 | * | 8/2001 | Rapport et al. .............. 370/518 |
| 6,665,755 | B2 | * | 12/2003 | Modelski et al. ........... 710/100 |
| 6,718,476 | B1 | * | 4/2004 | Shima ......................... 713/400 |
| 6,731,667 | B1 | * | 5/2004 | Lee et al. .................... 375/130 |
| 2001/0024135 | A1 | * | 9/2001 | Harrison ..................... 327/276 |
| 2002/0116442 | A1 | * | 8/2002 | Modelski et al. ........... 709/106 |

* cited by examiner

*Primary Examiner*—Dang Ton
*Assistant Examiner*—Michael J. Moore, Jr.
(74) *Attorney, Agent, or Firm*—Steubing McGuinness & Manaras LLP

(57) ABSTRACT

A memory interface for a switching router in a network communications system. The interface operates at 200 MHz PLL clock using high speed transistor logic I/O buffers. The interface allows transfer of clock synchronization signals along with the data signals. This allows the setup/hold times to be optimized for an inbound or outbound data pipeline. During writes, data is at least driven one clock cycle after the address. The interface provides flexibility by utilizing at least two clock cycles in order to accommodate a myriad of memory devices (e.g., burst mode SSRAMs having HSTL I/O). In operation, most of the data transfers through the interface are either direct reads or lookup reads. The interface stores writes are stored in a buffer in order to reduce bus turn around penalties.

10 Claims, 5 Drawing Sheets

HIGH SPEED PHYSICAL CIRCUITS OF MEMORY INTERFACE

BACKGROUND OF THE INVENTION

1. Field of the Invention

The present invention generally relates to the field of data communications and data processing architectures. More particularly, the present invention relates to a high speed memory interface for an external random access memory device.

2. Description of Related Art and General Background

The unprecedented growth of data networks (e.g., corporate-wide Intranets, the Internet, etc.) as well as the development of network applications (e.g., multimedia, interactive applications, proprietary corporate applications, etc.) have resulted in creating a demand for higher network bandwidth capabilities and better network performance. Moreover, such demands are exacerbated by the advent of policy-based networking, which requires more data packet processing, thereby increasing the amount of work per packet and occupying processing resources. One approach to increase network bandwidth and improving network performance is to provide for higher forwarding and/or routing performance within the network.

Some improvements in routing performance are directed to enhancing processor throughput. Processor designers have been able to obtain throughput improvements by greater integration, by reducing the size of the circuits, and by the use of single-chip reduced instruction set computing (RISC) processors, which are characterized by a small simplified set of frequently used instructions for rapid execution. It is commonly understood, however, that physical size reductions cannot continue indefinitely and there are limits to continually increasing processor clock speeds.

Further enhancements in processor throughput include modifications to the processor hardware to increase the average number of operations executed per clock cycle. Such modifications, may include, for example instruction pipelining, the use of cache memories, and multi-thread processing. Pipeline instruction execution allows subsequent instructions to begin executing before previously issued instructions have finished. Cache memories store frequently used and other data nearer the processor and allow instruction execution to continue, in most cases, without waiting the full access time of a main memory. Multi-thread processing divides a processing task into independently executable sequences of instructions called threads and the processor, recognizing when an instruction has caused it to be idle (i.e., first thread), switches from the instruction causing the memory latency to another instruction (i.e., second thread) independent from the former instruction. At some point, the threads that had caused the processor to be idle will be ready and the processor will return to those threads. By switching from one thread to the next, the processor can minimize the amount of time that it is idle.

In addition to enhancing processor throughput, improvements in routing performance may be achieved by partitioning the routing process into two processing classes: fast path processing and slow path processing. Partitioning the routing process into these two classes allows for network routing decisions to be based on the characteristics of each process. Routing protocols, such as, Open Shortest Path First (OSPF) and Border Gateway Protocol (BGP), have different requirements than the fast-forwarding Internet Protocol (FFIP). For example, routing protocols, such as OSPF and BGP, typically operate in the background and do not operate on individual data packets, while FFIP requires IP destination address resolution, checksum verification and modification, etc. on an individual packet basis.

The IP fast forwarding problem is becoming harder as the amount of time allotted for processing on a per packet basis steadily decreases in response to increasing media transmission speeds. In an effort to alleviate this problem, many router and Layer-3 switch mechanisms distribute the fast path processing to every port in their chassis, so that fast path processing power grows at a single port rate and not at the aggregate rate of all ports in the box. This provides only temporary relief as network wire speeds have increased exponentially recently (e.g., Ethernet's 10, 100, to 1,000 MBps increase) while processing speeds have traditionally improved, on average, by a factor of two every 18 months. It is clear that most of current solutions will run out of steam, as the faster media become the mainstream.

There are a number of integrated circuit memories commercially available. For example, dynamic memory circuits having memory cells arranged to be accessed in a random fashion are referred to as dynamic random access memories, DRAMs. These memories can be produced in a variety of designs which provide different methods of reading from and writing to the dynamic memory cells. One such method is page mode operations. Page mode operations in a DRAM are defined by the method of accessing a row of a memory cell array and randomly accessing different columns of the array. Data stored at the row and column intersection can be output while that column is accessed.

An alternate type of memory access is the extended data output (EDO) memory which allows data stored at a memory array address to be available as output after the addressed column has been closed. Yet another type of operation is included in a burst EDO memory which adds the ability to address one column of a memory array and then automatically address additional columns in a predetermined manner without providing the additional column addresses on external address lines.

Clocked synchronous memory, such as synchronous static random access memory (SSRAM) and synchronous dynamic random access memory (SDRAM) utilize a free running clock in order to perform transfers of data. In such a configuration, the clock continues to run without interruption as long as power is applied to the system. Each clocked synchronous memory accepts a free running clock signal on a clock input.

SUMMARY OF THE INVENTION

The present invention is provides fast path processing, in a route switch mechanism having a plurality of processors having a data transfer rate that is about ten gigabits per second. To achieve this end, the present invention provides a processor interface in each processor that transfers data, in the form of packets, to and from each processor across the bus in a source synchronous model.

BRIEF DESCRIPTION OF THE DRAWINGS

The above and other objects, features and advantages of the present invention are further described in the detailed description which follows, with reference to the drawings by way of non-limiting exemplary embodiments of the invention, wherein like reference numerals represent similar parts of the present invention throughout the several views and wherein.

DETAILED DESCRIPTION OF THE INVENTION

The innovative teachings of the present application will be described with particular references to the present embodiments. However, it should be understood that this class of embodiments provides only a few examples of the many advantageous uses of the innovative teachings described herein. In general, statements made in the specification of the present application do not necessarily delimit any of the various claimed inventions. Moreover, some statements may apply to some inventive features but not to others.

The present invention generally relates to communication networking host system and, more particularly, to packet processing architecture employed within a communication network that provides fast path processing and enhanced flexibility/adaptability of packet processors. The packet processing architecture will hereinafter be referred to as packet router mechanism of a communications networking host system for fast path processing of data packets at a rate of about 10 gigabits per second having several components. Such a system is set forth in co-pending application, filed on the even day herewith, entitled ROUTE SWITCH PACKET ARCHITECTURE, and herein incorporated by reference.

In the packet processing architecture, the inventive interface component provides for high speed memory access between an external memory engine of the packet processing architecture and a random memory access device. The external memory engine (EME) interface is designed to be compatible with late-write 256K×36 Synchronous Pipeline SRAMs. During writes, data is driven one clock cycle after the address, but this may be increased to two cycles by setting a register bit. The purpose of this flexibility is to support future lower cost SSRAMs that have HSTL I/O such as burst mode devices. Most of the transactions on the EME are reads, either directly or for lookups. When a write is issued, the EME stores the data in a write buffer. When the buffer is full, it is flushed to external memory as a burst to reduce bus turn-around-time penalties.

Figure 1:
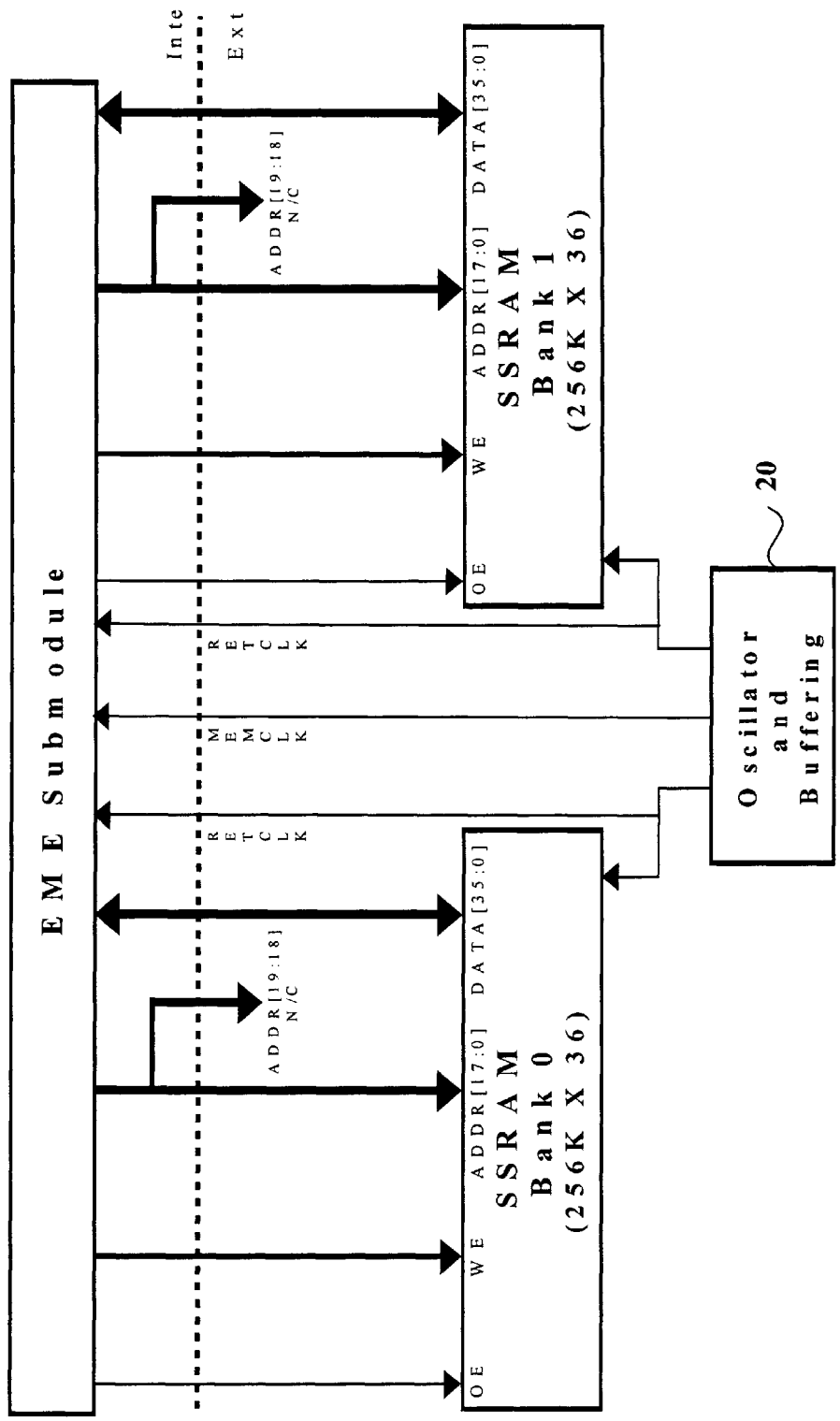
FIG. 1 is a block diagram of the memory interface of the present invention.
Figure 2:
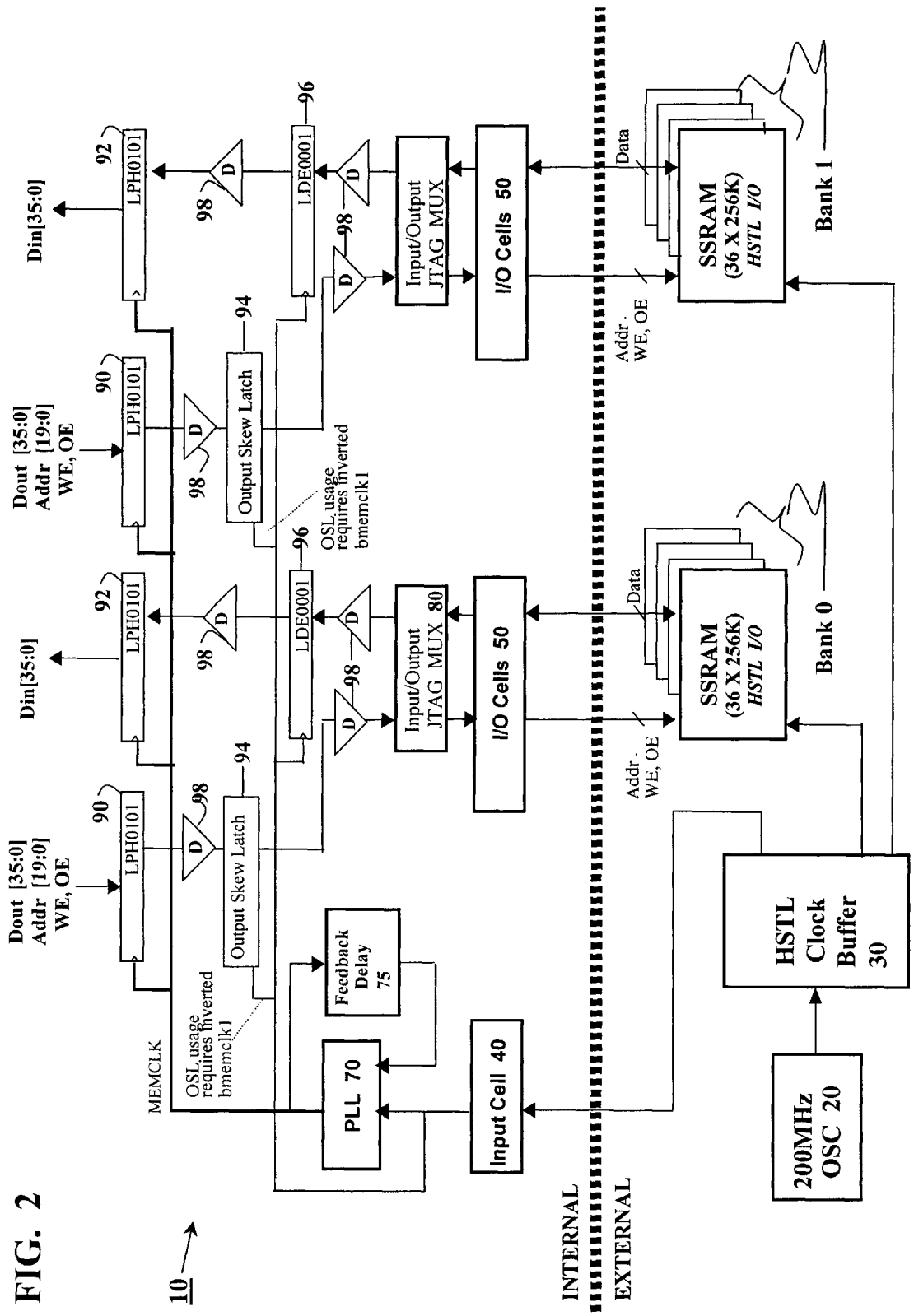
FIG. 2 is a detailed block diagram of the architecture of the memory interface according to the present invention.

FIGS. 1 and 2 illustrate the typical EME interface and memory configuration connections. When memory is expanded, for example four memories per bank, the remaining address bits (18 and 19) are decoded by PAL or other logic. The address, OE, and WE signals are buffered and registered so that they are point-to-point connections to the individual memories. The data bus is muxed and registered between the EME I/F and the four memories. This adds a clock cycle to the write and read path, adding two extra cycles. These cycles are removed by shortening the EME pipeline by two stages, keeping the control logic simple. The SSRAMs will be as close as possible to the switching router. Pinout of this interface is defined to promote the best circuit layout for one or two (or more) SSRAMs.

The EME can access two separate 36-bit memory banks independently. Even parity is implemented for each byte during 32 and 64-bit accesses. The analysis machines can issue burst reads or writes of 8 over the global access bus, while the packet manipulator may issue a burst read of 8 using a separate high-speed access port with a 64-bit wide data bus. A 64-bit access from the packet manipulator is split across both banks, while a similar access from the analysis machines will cause the EME to double pump a single bank. All 64-bit accesses from the analysis machines and packet manipulator are word aligned. Each bank supports memory expansion for four SSRAMs, 256K in depth each. When memory is expanded, a register bit is set to remove a pipeline stage in the read and write paths. This means the issue and receive queues are "shortened" by one entry so there is an extra clock cycle available to perform external address decode and data muxing. The data bus muxing between memories will be accomplished with transceivers so that all connections are point-to-point to run the memories at 200 MHz. The switching router will use two EMEs, one for lookups and filters while the other is primarily for results memory. When the EME is used in the CLUE, the signals for the high-speed access port will be tied off and the related logic optimized out during synthesis. Lookup performance will reach 25+ million lookups per second for a single memory bank. This is based on a 24-bit key for a IP-V4 lookup, requiring 7–8 memory cycles running at 200 MHz. Assuming the lookup tables are well distributed across memory banks, an EME could reach 50+ million lookups per second using both memory banks. Lookup performance is reduced when these operations have to compete with reads/writes from the analysis machines and packet manipulator.

The EME is pipelined to improve speed and mirror external memory. There are two pipelines, one for each bank that operate independently of each other. Hence, there are two separate ALUs, two write buffers, etc. FIG. 2 shows a detailed block diagram of the architecture of the EME. There are two asynchronous boundaries:

1. The first is in the global access bus controller, which synchronizes between the internal switching router clock and the local clock (MEMCLK) to run the EME core.
2. The second is in the high-speed access port (HSAP) controller for the packet manipulator.

A separate clock input is used for the EME sub-block so that SSRAMs of various speeds are used independent of the clock frequency of the switching router. The asynchronous boundaries are bridged with asynchronous FIFOs that are deep enough to prevent latencies from reducing bandwidth.

As seen in FIG. 2, the memory interface 10 includes: a 200 MHz oscillator 20, a high speed transistor logic (HSTL) clock buffer 30, a bank 0 and a bank 1 of SSRAMs (however, each bank may contain several SSRAMs as shown in phantom lines), I/O cells 50, I/O multiplexers 80, an input cell 40, a phase locked loop 70 with a feedback delay 75, data read latches or flops 92, data write latches or flops 90, signal delays 98, and skew adjusting latches for data write 94 and data reads 96.

The external portion of the interface has the oscillator 20, which generates a continuous cyclic signal at a frequency of 200 Mhz. The clock buffer 30 receives the continuous cyclic signal from oscillator 20. Clock buffer 30 registers the signal of oscillator 20 and provides a plurality of timing control signals. These timing control signals produce the synchronization through the interface so as to maintain the processing of data packets at a rate of about 10 gigabits per second. In addition, the bank 0 and bank 1 are 36×256K synchronous pipeline SRAM modules. The expandability of the interface allows a plurality of modules in each bank. The size of the memory module is dependent on the amount of data packets to be processed by the networking communications system housing the interface for data read/writes and lookups. The timing signals produced by the clock buffer 30 are fed to the SSRAMs for synchronizing the clocking of the memory during the read/write operations.

The internal portion of the interface 10 is the portion that is internal to the switching router, incorporated by reference above. The internal portion includes an input cell 40 which receives the timing signal of the clock buffer 30. The input cell 40 acts as a input pass through for smoothing the timing signals. The input cell 40 sends the timing signals to the phase locked loop 70 which locks onto and maintains the frequency of the timing signal from the clock buffer 30. In maintaining the frequency, a feedback delay 75 returns a sample timing signal at the same clocking frequency with a delay. This insures that the output of the phase locked loop is continuously adjusted to an operational frequency of about 200 MHz.

The memory clocking (MEMCLK) signal from the phase locked loop 70 controls the flops 90 for sending address, control, and data signals from the switching router to a memory location in the SSRAMs (bank 0 or bank 1). The output of the input cell 40 is also fed to output skew latches 94 and input skew latches 96, it is noted that the input skew latches have an inverted input, thereby receiving a signal 180° out of phase. This is important because the output skew latches 94 allow data flow when input skew latches 96 prohibit data flow, and the reverse also holds.

Multiplexers 80 are configured to gate data transfer to and from the SSRAMs. The multiplexers 80 use the joint test action group (JTAG) instructions [please provide information on the JTAG]. The multiplexers 80 fed the write signals from the switching router through I/O cells 50 to the SSRAMs. I/O cells convert the switching router signals into data and control signals. The control signals include address, write enable (WE) and output enable (OE). The I/O cells retrieve data from the SSRAMs and sends the data to the multiplexers 80, which is gated back to the switching router. To avoid signal jitter caused by the latches 90, 92, 94, and 96 and multiplexers changing read/write states, several signal delays 98 are inserted in the interface. The interface 10 provides a synchronous transfer at a constant frequency, namely 200 MHz, such that the switching router stores and retrieves data to and from the SSRAMs at a rate approximating 10 gigabits per second.

Figure 3:
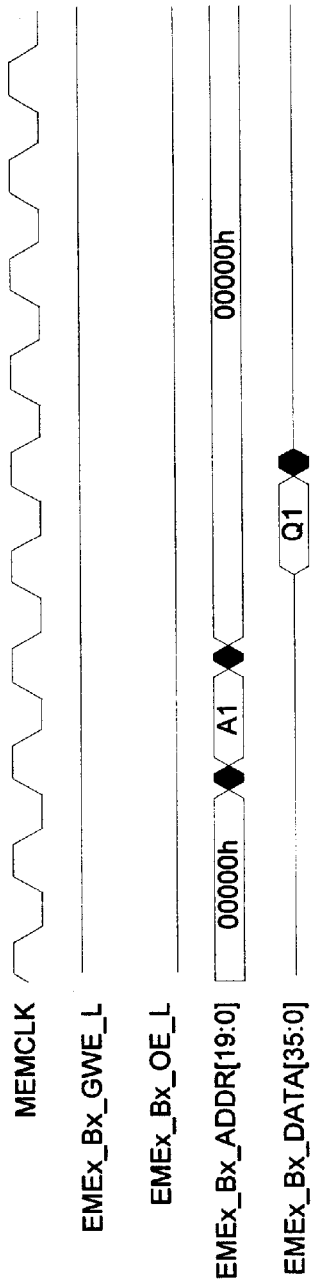
FIGS. 3–8 are timing diagrams of the operations of the interface according to the present invention.

FIG. 3 shows a timing diagram during a single read operation of the memory interface, the memory registers the control signals on the rising clock edge. There is a synchronous chip select signal (SS_L) that should always be asserted by connecting a pulldown on the PCB. When the EME does not have any transactions, it will simply issue reads with an address of 00000h and discard the data. The memory also has a 'ZZ' pin to control the power down mode. If this feature is used, the board designer will have to add a register externally to control this pin via a host CPU. FIG. 3 illustrates the timing of a single read operation to the SSRAM, with no reads or writes before or after the memory pipeline.

The address bus switches from the idle state of all zeros to an address of A1 as seen on the third rising clock edge. The memory registers the address on the fourth rising edge while the switching router drives the next address which is all zeros (idle state). The EME timing is uses the signal names: Global write enable, EMEx_Bx_GWE_L, Byte write enable, EMEx_Bx_BWE_L, Output enable EMEx_Bx_OE_L, data is EMEx_Bx_DATA, address is EMEx_Bx_ADDR, and the synchronous clock signal is MEM-CLK. The switching router always asserts the EMEx_Bx_OE_L signal so the memory data bus does not float. The switching router registers the data on the sixth rising clock edge and the read cycle is complete.

Figure 4:
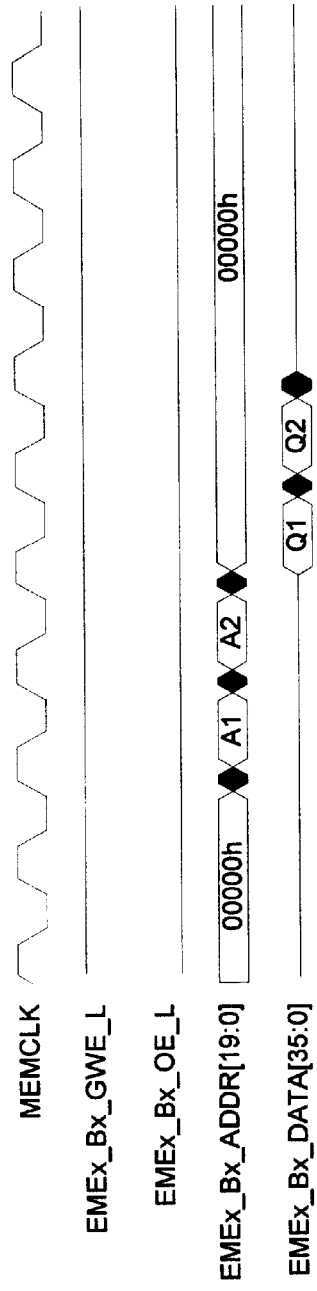
Figure 5:
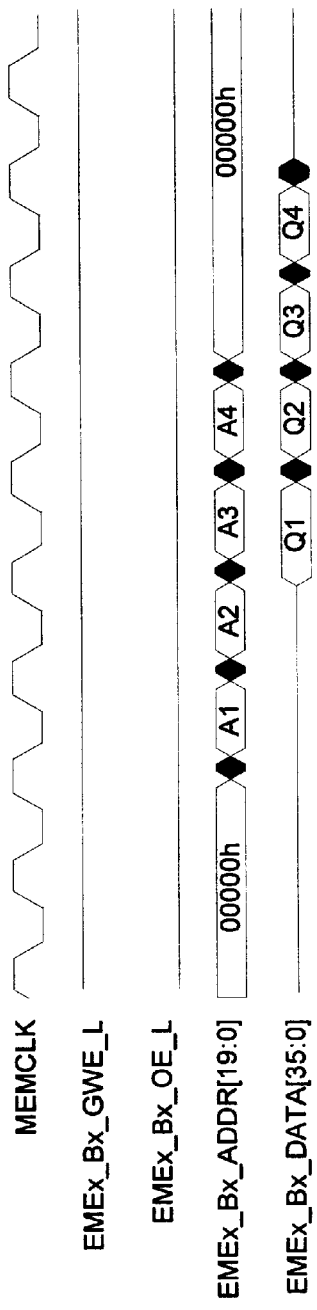

FIG. 4 shows a timing diagram of a burst of two reads in a back to back read function. FIG. 5 shows the timing of a continuous burst of read function. In this example, four reads occur in a continuous string.

Figure 6:
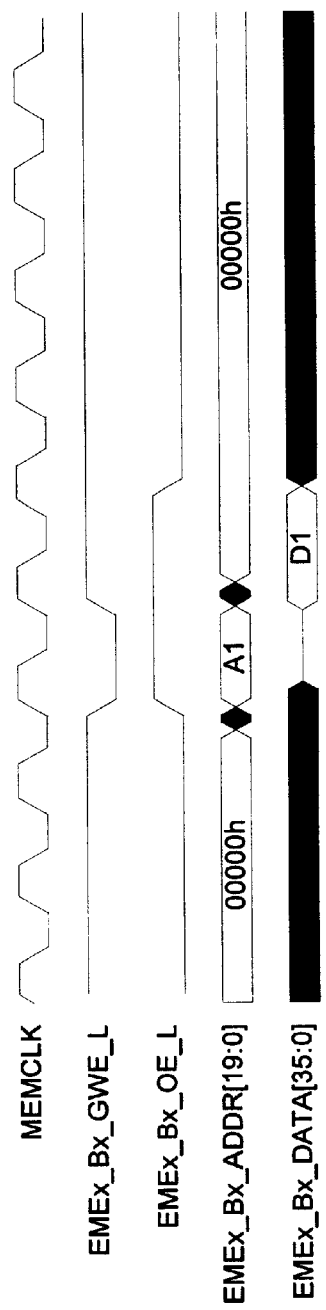
Figure 7:
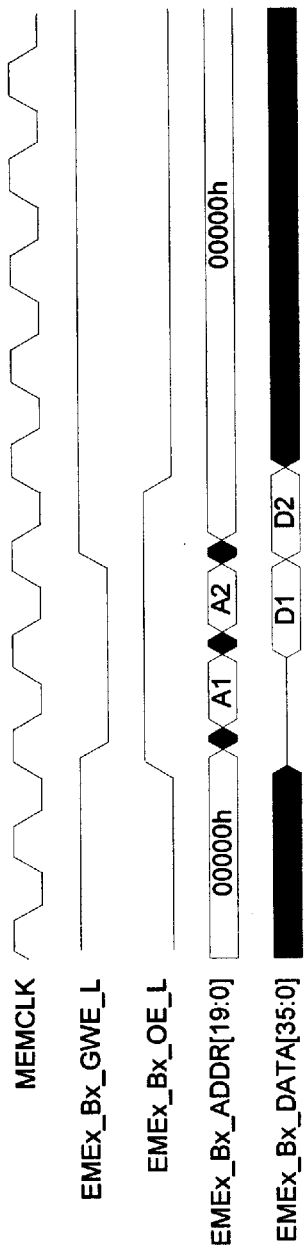
Figure 8:
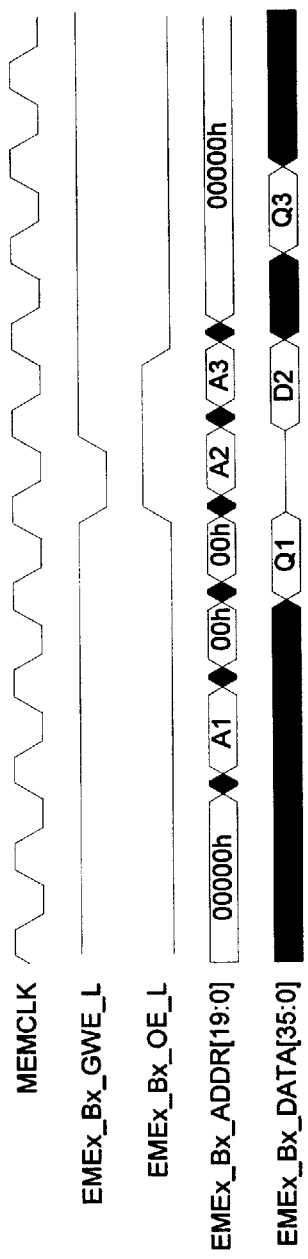

FIG. 6 illustrates timing of a single write with no prior memory transactions in the pipeline. The EMEx_Bx_OE_L signal is asserted a cycle early to allow time for the data bus to settle and avoid bus contention. Data is driven on the next cycle and the SSRAM latches the data on the next rising clock edge. FIG. 7 shows a timing diagram of a burst of two writes. Signal timing is the same as a single write, with a latency of one clock cycle. The EME state machine looks ahead one cycle in the memory issue queue to determine whether the output enable and write enable signals should change state. If the next transaction is a write, these signals do not change so there is no additional bus turn-around-time penalty for subsequent writes. If there is a write-read-write sequence, the penalty is unavoidable. FIG. 8 is a sample timing diagram showing a mixing of reads and writes with one dead cycle for bus turn-around-time. Based on timing analysis, a dead cycle is required to avoid bus contention. This is accomplished by advancing the assertion of EMEx_Bx_OE_L by one cycle before data is driven by the RSP2. When switching back to the "read" direction, the RSP2 data lines switch to input mode at the same time as EMEx_Bx_OE_L asserts. Since the SSRAM has a delayed response to the OE signal, there can never be any bus contention during this transition.

While the invention has been described by way of example embodiments, it is understood that the words, which have been used herein, are words of description, rather than words of limitation. Changes may be made, within the purview of the appended claims, without departing from the scope and spirit of the invention in its broader aspects. Although the invention has been described herein with reference to particular structures, materials and embodiments, it is understood that the invention is not limited to the particulars disclosed. The invention extends to all equivalent structures, mechanisms, acts, and uses, such as are within the scope of the appended claims.

What is claimed is:

1. An interface for transferring data between a network switching router for fast path processing of network data packets and at least one memory device, comprising:
   an external portion having a clock source for generating a continuous cyclic signal, a clock buffer coupled to said clock source for registering said continuous cyclic signal and providing a plurality of timing control signals and said at least one memory device; and
   an internal portion having an input cell, a phase locked loop, at least one multiplexer, and a plurality of controlled latches, said input cell is coupled to said clock buffer for receiving one of said timing control signals and transforming said timing control signals into pulses, said phase locked loop coupled to said input cell for receiving said pulses, said phase locked loop maintaining a timing pulse frequency in response to said pulses, said at least one multiplexer configured to gate data transfer to and from said internal portion and said external portion, said controlled latches responsive to said timing pulse frequency for coupling said switching router to said at least one multiplexer, such that said switching router stores and retrieves data to and from said at least one memory device at a rate about 10 gigabits per second, wherein said at least one memory receives another one of said timing control signals from said clock buffer; and wherein said timing pulse frequency provides synchronization between said external portion and said internal portion.

2. The interface according to claim 1, wherein the phase locked loop includes a feedback delay for adjusting said timing pulse frequency, wherein said timing pulse frequency is maintained at a fixed rate.

3. The interface according to claim 1, wherein a first portion of said plurality of controlled latches is configured to receive data and control signals from said switching router for storing in said memory device, said first portion of controlled latches is controlled by said timing pulse frequency.

4. The interface according to claim 3, wherein a second portion of said plurality of controlled latches is configured to receive data from said memory device for retrieval by said switching router, said second portion of controlled latches is controlled by said timing pulse frequency.

5. The interface according to claim 3, wherein a third portion of said plurality of controlled latches is configured to synchronize data received from said first portion of controlled latches for verifying a skew rate of data transfer from said switching router to said multiplexer, said third portion of controlled latches is controlled by said pulses of said input cell.

6. The interface according to claim 1, wherein said clock being an oscillator having a frequency of at least 200 MHz.

7. The interface according to claim 1, wherein said at least one memory device includes at least a first bank and a second bank of SRAM.

8. The interface according to claim 7, wherein said first bank and said second bank of SRAM each being synchronous SRAM.

9. The interface according to claim 1, further comprising a plurality of delay units for preventing data transfer conflicts.

10. The interface according to claim 1, wherein said multiplexer and said memory device having I/O cells coupled therebetween for buffering the data to and from said memory device.

* * * * *